United States Patent [19]

Sakamoto et al.

[11] Patent Number: 4,600,941

[45] Date of Patent: Jul. 15, 1986

[54] SCRAMBLING SYSTEM FOR AUDIO FREQUENCY SIGNALS

[75] Inventors: Akira Sakamoto; Toshihiko Waku; Takeshi Fukami; Masakatsu Toyoshima, all of Tokyo; Michimasa Komatsubara, Chiba, all of Japan

[73] Assignee: Sony Corporation, Tokyo, Japan

[21] Appl. No.: 560,957

[22] Filed: Dec. 13, 1983

[30] Foreign Application Priority Data

Dec. 17, 1982 [JP] Japan .............................. 57-222299

[51] Int. Cl.⁴ .............................................. H04N 7/167

[52] U.S. Cl. ...................................... 358/121; 358/122

[58] Field of Search ................ 358/114, 121, 123, 122

[56] References Cited

U.S. PATENT DOCUMENTS

| | | | |
|---|---|---|---|
| 4,070,693 | 1/1978 | Shutterly | 358/123 |
| 4,266,243 | 5/1981 | Shutterly | 358/121 |

FOREIGN PATENT DOCUMENTS

| | | |
|---|---|---|
| 1402458 | 9/1972 | United Kingdom . |

*Primary Examiner*—S. C. Buczinski
*Assistant Examiner*—M. Koltak
*Attorney, Agent, or Firm*—Lewis H. Eslinger; Alvin Sinderbrand

[57] ABSTRACT

A scrambling system for an audio frequency signal in which an audio signal is divided into blocks, each block being formed of a plurality of frames, the plurality of frames are rearranged on a timebase in a predetermined order at every block so as to be encoded and the encoded signal is re-arranged on the timebase in an original order so as to be decoded, in which there are provided a first signal processing circuit for inserting a redundant portion into a portion between adjoining frames and timebase-compressing the frames in response to the redundant portions upon encoding, a control signal generating circuit for inserting a control signal other than an audio information into the redundant portions, a control signal detecting circuit for detecting the control signal upon decoding and a second signal processing circuit for removing the redundant portions in synchronism with the detected control signal and timebase-expanding the frames in response to the redundant portions. Therefore, even when the audio signal is transmitted through a system in a transmission path having a timebase fluctuation such as a transmission path of a VTR (video tape recorder) and the like the frequency band region of which is restricted, the signal waveform is not distorted and a noise is not mixed therein so that the scrambling communication having high quality and high reliability can be presented.

7 Claims, 29 Drawing Figures

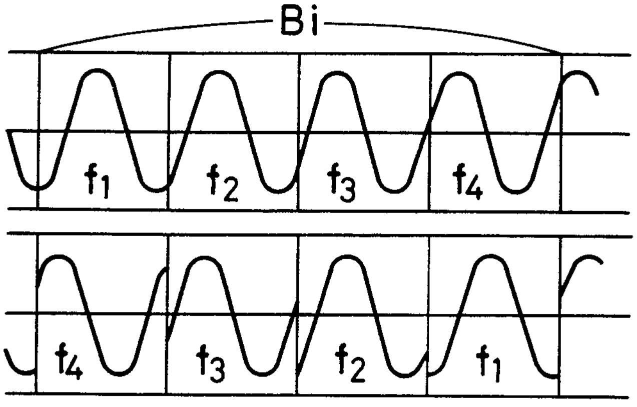
FIG. 1A
(PRIOR ART)
FIG. 1B
(PRIOR ART)
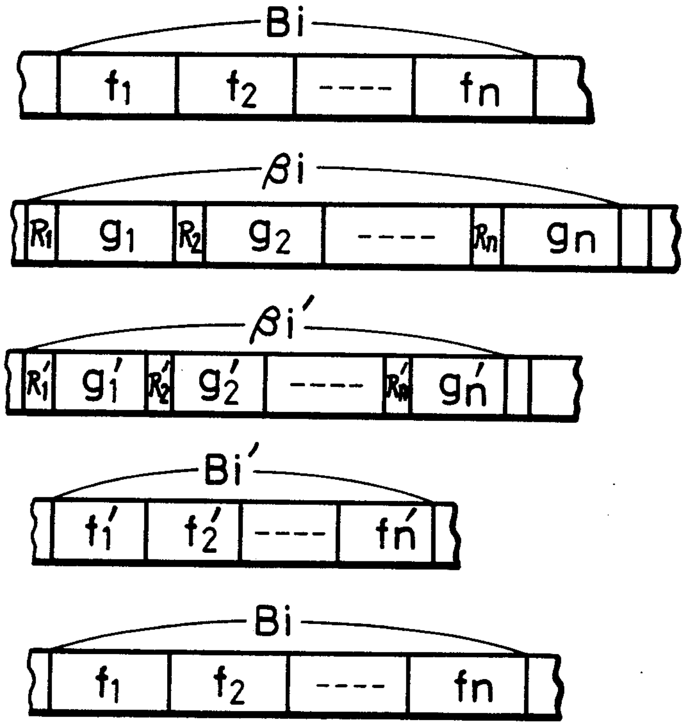
FIG. 2A
FIG. 2B
FIG. 2C
FIG. 2D
FIG. 2E FIG. 3A
FIG. 3B
FIG. 3C
FIG. 3D
FIG. 3E
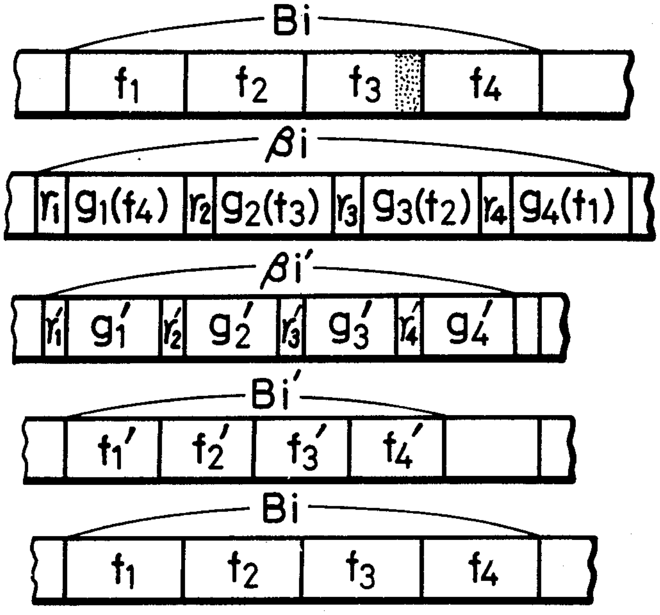
FIG. 5A
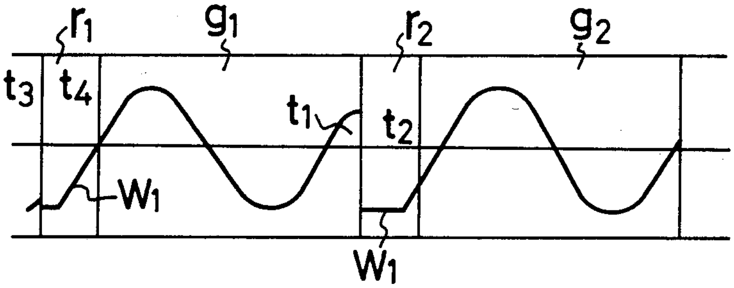
FIG. 5B
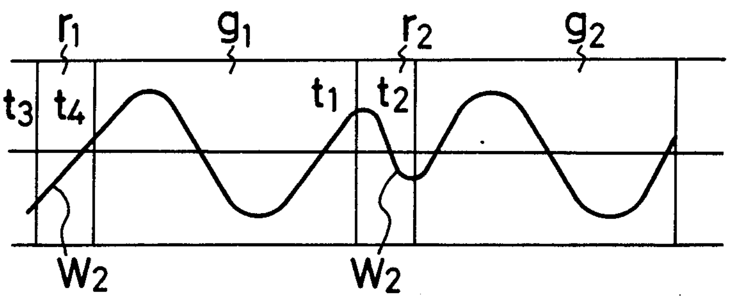

FIG. 6A
FIG. 6B
FIG. 6C
FIG. 6D
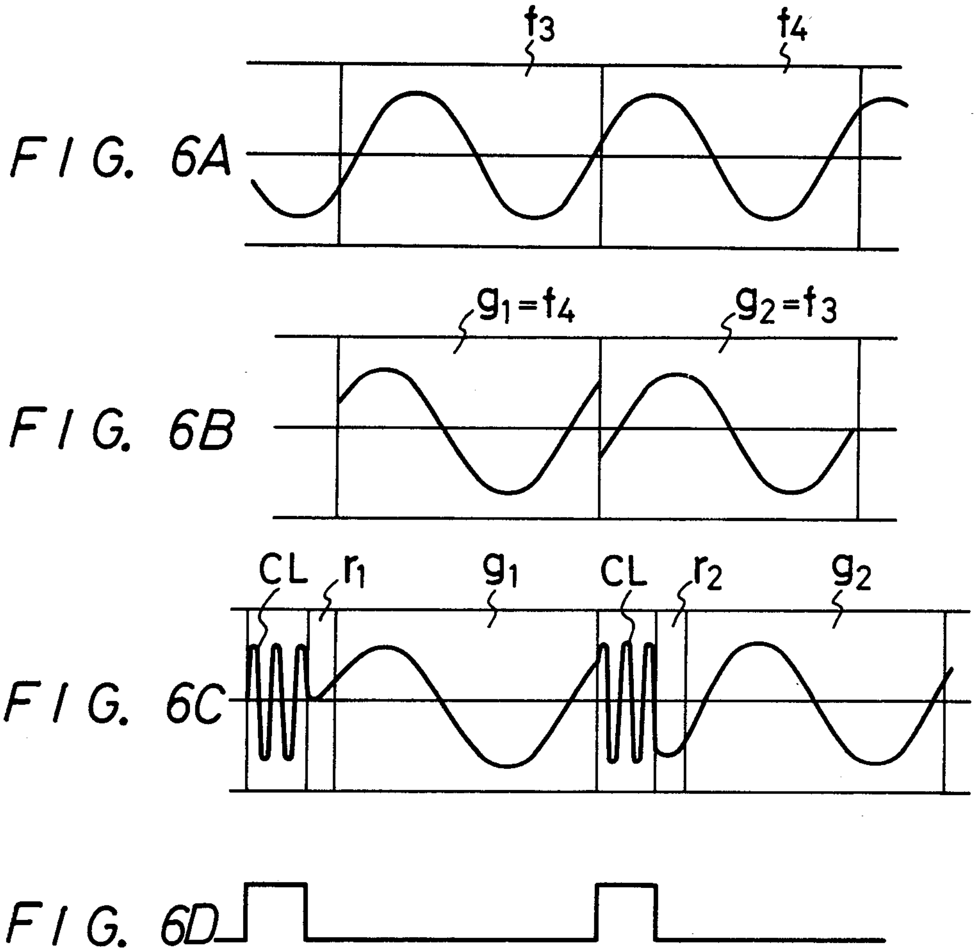
FIG. 7
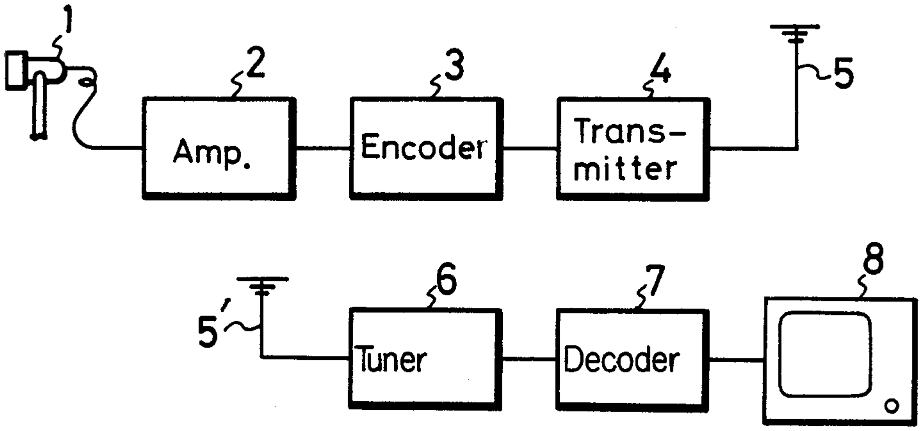

SCRAMBLING SYSTEM FOR AUDIO FREQUENCY SIGNALS

BACKGROUND OF THE INVENTION

1. Field of the Invention

The present invention relates generally to a scrambling system for audio frequency signals and more particularly is directed to a scrambling system for audio frequency signals suitable for use with a pay television broadcast system.

2. Description of the Prior Art

In a radio communication and a magnetic recording system, there is sometimes employed a scrambling system for audio frequency signals. As an example of the former, a pay television broadcast system is considered. In the pay television broadcast system, a broadcast station (transmitter) and a user (receiver) conclude a contract having such a content that the user pays the broadcast station in compensation for enjoying a particular television broadcast program. In the radio communication, the receiver is not limited in principle so that the scrambling system for audio frequency signals is employed to thereby enable only the user who concludes the contract with the broadcast station to enjoy the particular television broadcast. Meanwhile, as an example of the latter, a so-called automatic answering telephone is considered. When it is necessary to keep the secret of the recorded content of the automatic answering telephone, such secret information is recorded by employing the scrambling system and after that, the content of the information can be reproduced and known to a particular person by use of a predetermined decoder.

Roughly classified, there are proposed two scrambling systems. One system is that the audio signal data is re-arranged on its frequency axis, while the other system is that the audio signal data is re-arranged on its timebase. The present invention concerns the latter system. As the latter system, there are proposed the following systems: the polarity of the sampled value of an audio signal is changed in accordance with a predetermined rule; the audio signal is divided into frames on the timebase and then the order of the sampled values is changed within one frame; and the several frames thus divided on the timebase are changed in order. By the way, in the system in which the audio signal data is re-arranged on the timebase, except the last system mentioned above, the audio signal after being re-arranged in order becomes wide in frequency band as compared with the original audio signal so that if this audio signal re-arranged is transmitted through the communication or transmission path the band region of which is restricted, a distortion occurs in the audio signal upon re-arranging or decoding. The last system has less defects mentioned above and is particularly suitable as the scrambling system. In this case, however, the order of several frames is changed so that the audio signal is caused to change abruptly at the connected portion between the ends of the frames, thus mixing a noise into the audio signal upon decoding.

An audio signal of a sine wave as, for example, shown in FIG. 1 is considered. In this case, the audio signal is divided into blocks Bi on the timebase. Each of the blocks Bi is formed of four frames $f_1$, $f_2$, $f_3$ and $f_4$. Then, in each block Bi, the frames $f_1$, $f_2$, $f_3$ and $f_4$ are arranged in the sequential order of FIG. 1B, namely, in the sequential order of the frames $f_4$, $f_3$, $f_2$ and $f_1$. As will be clear from FIG. 1B, the audio signal thus obtained abruptly rises up or falls down at the boundary between the frames. Accordingly, if this audio signal is transmitted through the transmission path having the narrow transmission band region and particularly when the transmission path does not allow the high frequency component to pass therethrough, the signal waveform is blunted. Thus, when the audio signal is again re-arranged or decoded on the receiving side, the original audio signal is distorted or a noise is superimposed upon the original audio signal, etc.so that the quality of the audio signal is deteriorated.

OBJECTS AND SUMMARY OF THE INVENTION

Accordingly, it is an object of the present invention to provide an improved scrambling system for audio frequency signals.

It is another object of the present invention to provide a scrambling system for audio frequency signals which can prevent an audio signal from being distorted in signal waveform and being mixed with a noise when the audio signal is transmitted through a transmission path the band region of which is restricted.

It is further object of the present invention to provide a scrambling system for audio frequency signals capable of carrying out the scrambling communication with a signal waveform of excellent quality and with an excellent tone quality.

It is still further object of the present invention to provide a scrambling system for audio frequency signals which is suitable for use with a pay television broadcast system.

According to one aspect of the present invention, there is provided a scrambling system for an audio frequency signal in which an audio signal is divided into blocks, each block being formed of a plurality of frames, said plurality of frames are re-arranged on a timebase in a predetermined order at every block so as to be encoded and said encoded signal is re-arranged on the timebase in an original order so as to be decoded comprising:

a first signal processing means for inserting a redundant portion into a portion between adjoining frames of said frames and timebase-compressing said frames in response to said redundant portions upon encoding;

a control signal generating means for inserting a control signal other than an audio information into said redundant portions;

a control signal detecting means for detecting said control signal upon decoding; and a second signal processing means for removing said redundant portions in synchronism with said detected control signal and timebase-expanding said frames in response to said redundant portions.

The other objects, features and advantages of the present invention will become apparent from the following description taken in conjunction with the accompanying drawings through which the like references designate the same elements and parts.

BRIEF DESCRIPTION OF THE DRAWINGS

FIGS. 1A and 1B are respectively timing charts showing an example of a conventional scrambling system for audio frequency signals;

FIGS. 2A to 2E are respectively timing charts used to explain the principle of the present invention;

FIGS. 3A to 3E are respectively timing charts showing an embodiment of a scrambling system for audio frequency signals according to the present invention;

FIGS. 5A and 5B are respectively timing charts showing a modified example of FIGS. 4A to 4D;

FIGS. 6A to 6D are respectively timing charts showing another embodiment of the scrambling system for audio frequency signals according to the present invention;

FIG. 7 is a block diagram showing an example of a pay television broadcast system to which the present invention is applied;

DESCRIPTION OF THE PREFERRED EMBODIMENTS

Figure 4A:
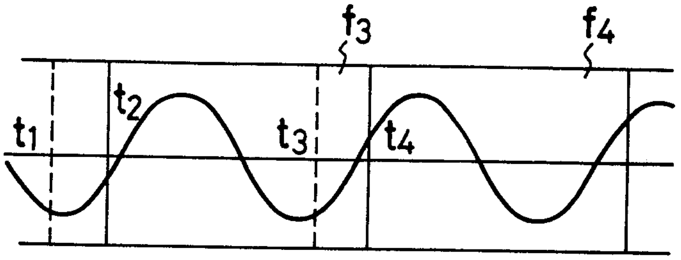
FIGS. 4A to 4D are timing charts useful for explaining the embodiment of the present invention shown in FIGS. 3A to 3E.
Figure 4B:
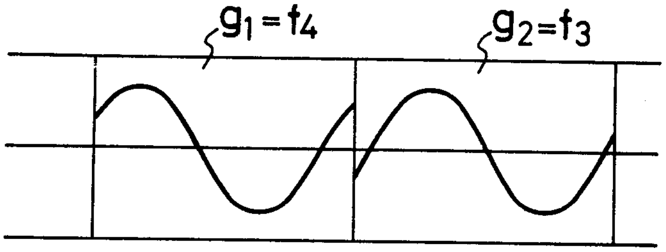

Now, an embodiment of a scrambling system for audio frequency signals according to the present invention will hereinafter be described in detail with reference to FIGS. 2 to 13.

First, the fundamental principle of the present invention will be described with reference to FIGS. 2A to 2E. In the present invention, the encoding and the decoding as shown in FIGS. 2A to 2E are carried out. In the encoding, an audio signal is divided into blocks Bi, each block being formed of a plurality of frames $f_1, f_2 \ldots f_n$ as shown in FIG. 2A. After that, the frames $f_1, f_2 \ldots f_n$ are rearranged on its timebase in a predetermined order at every block Bi. The frames $f_1, f_2 \ldots f_n$ thus arranged are sequentially represented as frames $g_1, g_2 \ldots g_n$ on the timebase as shown in FIG. 2B. Redundant portions $R_1, R_2 \ldots R_n$ are respectively inserted between the adjacent frames $g_1, g_2, g_3 \ldots g_n$, thus providing blocks $\beta$i. Then, in order that the timebase length of the blocks $\beta$i thus obtained may have the same timebase length of the original blocks Bi, as shown in FIG. 2C, the timebase compression is performed to produce blocks $\beta$i . After the encoding is carried out as mentioned above, the transmitting and the like thereof are performed. On the other hand, at the decoding, redundant portions $R_1', R_2' \ldots R_n'$ (which are provided by timebase-compressing the redundant portions $R_1, R_2 \ldots R_n$ with the primes in the references designating the same signal are eliminated from the audio signal which is transmitted in the form as shown in FIG. 2C and frames $g_1', g_2', g_3', g_4'$ are re-arranged in the original order so as to produce a block Bi' which consists of frames $f_1', f_2' \ldots f_n'$ as shown in FIG. 2D. Thereafter, the timebase expansion is performed therefor with an amount corresponding to the timebase compression shown in FIG. 2C and thereby the original block Bi is obtained as shown in FIG. 2E. In this way, the decoding is performed.

According to the present invention, the signal into which the redundant portions $R_1, R_2 \ldots R_n$ are inserted is transmitted through the radio communication and the transmission path of the magnetic recording and these redundant portions $R_1, R_2 \ldots R_n$ are employed as interpolation data to reduce the discontinuity on the boundary of the frames of the signal in the transmission path. Also even if such discontinuity is still left, it is possible to prevent the frame itself from being affected by the above discontinuity. Thus, the received or reproduced signal has less noise.

Moreover, if a control signal except the audio information is inserted into the redundant portions $R_1, R_2 \ldots R_n$, such control signal can be transmitted with the audio signal.

The number n of the frames $f_1, f_2 \ldots f_n$ constituting the block Bi and the length l of each frame can be selected variously. Upon selecting the number n and the length l, the storage capacity of the encoder and the decoder and the secret property of the scrambling are taken into consideration. For example, when the block Bi is formed of 2, 3 and 4 frames and the frame lengths l thereof are selected to be 8 mS, 16 mS, 32 mS, 65 mS and 130 mS, the content of the audio signal can be discriminated with the frame lengths l of 8 mS and 16 mS at any frame construction. The scrambling or secret property is established when the frame length l is equal to or longer than 32 mS and the scrambling property when the frame lengths l are 65 mS and 130 mS is strong. With respect to the scrambling property, the selecting condition is different depending on the kinds of the audio signal. For example, in sound such as conversation and the like, there are a large number of changes of acoustic sounds so that the frame length l of the frames $f_1, f_2 \ldots f_n$ is selected as small, while in a general music, there is less change of sound so that it is desired to select the frame length l of the frames $f_1, f_2 \ldots f_n$ as large.

Concerning the number n of the frames, as the n becomes large, the freedom of how to arrange the frames upon encoding becomes large. That is, since the permutation of n frames, $f_1, f_2 \ldots f_n$ is represented as n!, there are $(n!-1)$ ways of re-arranging $f_1, f_2 \ldots f_n$ into other arrangements. Further, if the timebase and the level of the waveform are reversed at each of the frames $f_1, f_2 \ldots f_n$, other modifications can be added thereto. The more the way of the encoding becomes the more the scrambling property is increased. Furthermore, the more preferable way of the encoding can be selected.

An embodiment of the present invention will hereinafter be described with reference to FIGS. 3A to 3E and FIGS. 4A to 4D. In this embodiment, the redundant portion is formed from the interpolation data of the audio signal.

Figure 4C:
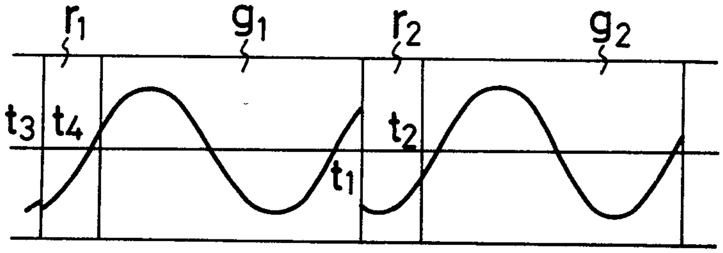
Figure 4D:
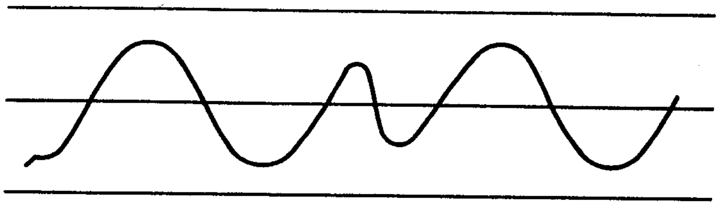

In FIG. 3, each block Bi provided by dividing the audio signal is formed of four frames $f_1$, $f_2$, $f_3$ and $f_4$ (see FIG. 3A). For example, the frame length is selected to be 62.5 mS and the block length is selected to be 250 mS ($62.5 \times 4$). The re-arrangement of the frames $f_1$, $f_2$, $f_3$ and $f_4$ is carried out such that the sequential order of the original arrangement is reversed on the timebase. Namely, $g_1=f_4$, $g_2=f_3$, $g_3=f_2$ and $g_4=f_1$. Then, interpolation data portions $r_1$, $r_2$, $r_3$ and $r_4$ are respectively inserted between the adjoining frames of the frames $g_1$, $g_2$, $g_3$ and $g_4$ (FIG. 3B). The length of each of these interpolation data portions $r_1$, $r_2$, $r_3$ and $r_4$ is selected as, for example, 4 mS. The audio signal unchanged is used as these interpolation data portions $r_1$, $r_2$, $r_3$ and $r_4$ That is, the interpolation data portion $r_1$ just before the frame $g_1(f_4)$ is used as the rear edge portion of the frame $f_3$ (shown by scattered points in FIG. 3A). This will further be considered with reference to practical waveforms shown in FIGS. 4A to 4D. As shown in FIG. 4, a waveform (FIG. 4A) which is continuous in the beginning is made discontinuous (FIG. 4B) by the re-arrangement of the order. This waveform discontinuity occurs at the boundary portion between, for example, the frames $g_1$ and $g_2$. Then, the waveform between time points $t_1$ and $t_2$ in FIG. 4A is inserted into the above discontinuous portion as the interpolation data $r_2$ whereby to keep the continuity over the range from the interpolation data $r_2$ to the frame $g_2$ as shown in FIG. 4C. Of course, although the discontinuity still remains at the end portion of the frame $g_1$, the disorder of the waveform due to the above discontinuity is stopped in the interval of substantially the interpolation data portion $r_2$ so that the continuous waveform can be held in the interval of the frame $g_2$, which fact is shown in FIG. 4D.

Similarly, the interpolation data portions $r_1$, $r_3$ and $r_4$ just before the frames $g_1(f_4)$, $g_3(f_2)$ and $g_4(f_1)$ are respectively used as the rear edge portions of the frames $f_3$, $f_1$ and $f_4$ of the preceding frames.

In FIG. 3, if the above interpolation data portions $r_1$, $r_2$, $r_3$ and $r_4$ are inserted into the frames $g_1$, $g_2$, $g_3$ and $g_4$, the block $\beta i$ (see FIG. 3B) can be obtained. And, this block $\beta i$ is timebase-compressed at a timebase-compressing rate of, for example, 250/266, to provide a block $\beta i'$, having the same length as that of the block Bi. Then, the audio signal formed of these blocks $\beta i'$ (encoded) is transmitted or recorded. In this case, a prime (') in FIG. 3 represents the frame or block which is timebase-compressed.

At the decoding side, the interpolation data portions $r_1'$, $r_2'$, $r_3'$ and $r_4'$ are removed and the frames $g_1'$, $g_2'$, $g_3'$ and $g_4'$ are re-arranged in the original sequential order. In other words, the frames $f_1'$, $f_2'$, $f_3'$ and $f_4'$ are re-arranged in this order (see FIG. 3D) to thereby produce the block Bi'. Then, this block Bi' is timebase-expanded at the timebase-expanding rate of 266/250 so as to produce the audio signal formed of the block Bi (FIG. 3E). As will be clear from the waveform shown in FIG. 4D and the description thereof, this audio signal is not substantially affected badly by the discontinuity of the waveform due to the re-arrangement of the order upon encoding so that the S/N (signal-to-noise) ratio thereof can be improved.

While in this embodiment part of the audio signal unchanged is used as the interpolation data portions $r_1$, $r_2$, $r_3$ and $r_4$, it is possible to employ a predetermined waveform forming circuit to produce artificial waveforms usable as the interpolation data $r_1$, $r_2$, $r_3$ and $r_4$. By way of example, a waveform $W_1$ as shown in FIG. 5A can be employed as the interpolation data $r_1$ to $r_4$. Also, it is possible to employ a waveform $W_2$ which can present a continuity held at both ends of the interpolation data portions $r_1$, $r_2$ . . . If the waveform $W_2$ is employed, the length of each of the interpolation data portions $r_1$, $r_2$ . . . can be reduced.

Another embodiment of the scrambling system for audio frequency signals according to the present invention will be described with reference to FIGS. 6A to 6D. In FIG. 6, like parts corresponding to those of FIG. 4 are marked with the same references.

In the embodiment shown in FIG. 6, control signal intervals except the audio information are provided in front of the interpolation data portions $r_1$ and $r_2$, into which a control signal CL is inserted as a timing signal of, for example, the re-arrangement of the order. And, the lengths of the interpolation data portions $r_1$ and $r_2$ are determined as predetermined ones so as to prevent the frames $g_1$ and $g_2$ from being affected by the control signal CL and the preceding discontinuous portion. Though not shown, in front of the interpolation data portions $r_3$ and $r_4$ there are provided control signal intervals into which the control signal CL is inserted.

When such control signal CL is extracted at the decoder side and used as the timing signal for the re-arrangement of the sequential order, a window pulse shown in FIG. 6D is employed.

In the embodiment shown in FIG. 6, the same effect as those in FIGS. 3 and 4 can be achieved. Moreover, according to this embodiment, since the control signal CL is transmitted together with the audio signal and then used as the timing signal of, for example, the re-arrangement of the sequential order, the discontinuity at the connection portion between the audio signals can be removed so that the quality of sound can be improved. In this case, if a synchronizing signal of a frame period and a synchronizing signal of a block period are transmitted as the control signal CL, they are very convenient.

The encoder and the decoder used in the scrambling system for audio frequency signals according to the present invention will be described next.

FIG. 7 shows a case in which the present invention is applied to a pay television broadcast system. In FIG. 7, reference numeral 1 designates a microphone, and the audio signal from this microphone 1 is amplified by an amplifier 2 and then fed to an encoder 3. The encoder 3 will be described in detail later (see FIG. 8). The audio signal encoded by the encoder 3 is supplied to a transmitter 4 and then transmitted through a transmitting antenna 5.

At the receiving side, the encoded audio signal thus transmitted is received by a receiving antenna 5' and decoded through a tuner 6 by a decoder 7 which will be described in detail later. Reference numeral 8 designates a television receiver.

Figure 8:
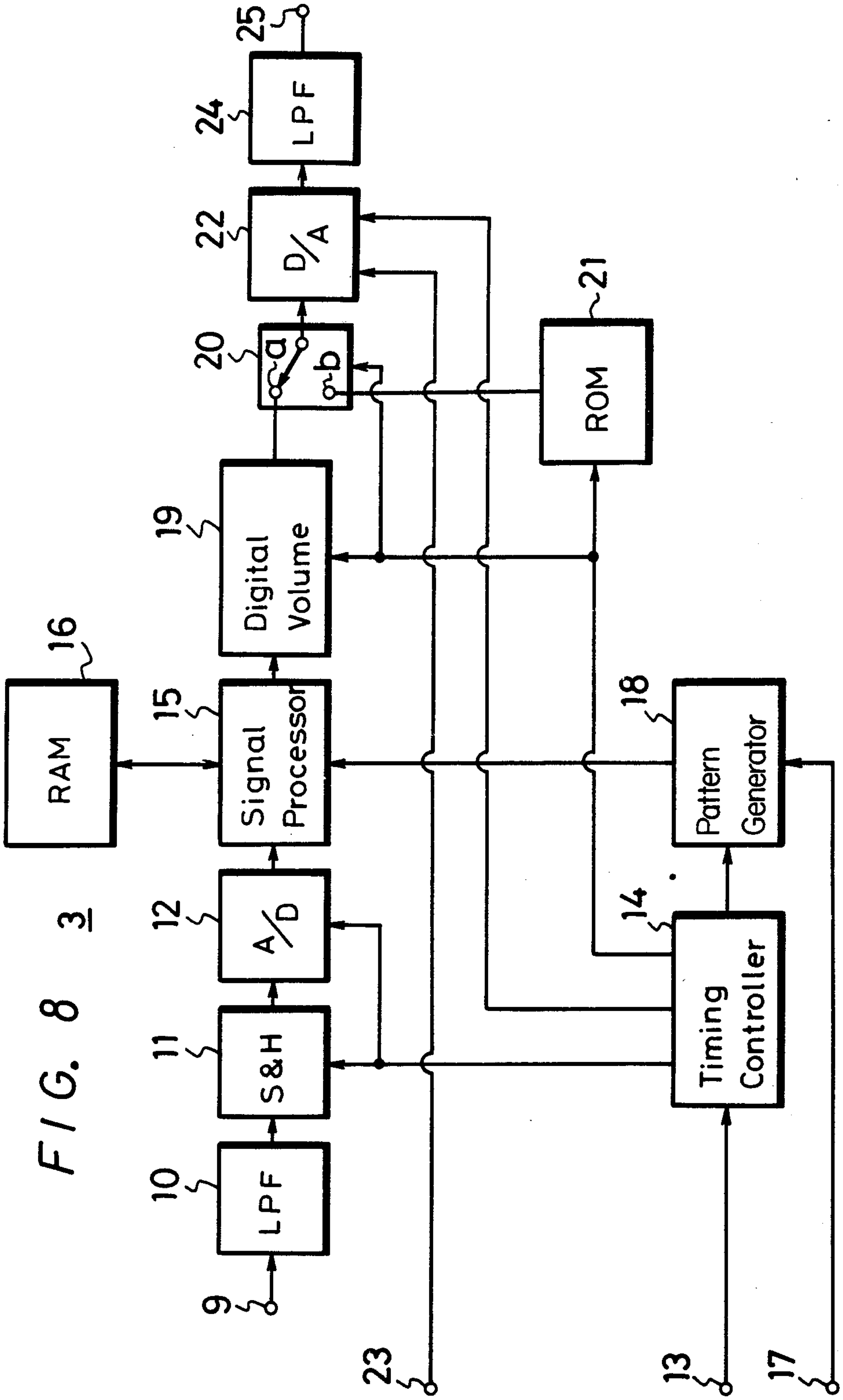
FIG. 8 is a block diagram showing an encoder used in the example shown in FIG. 7.

As the encoder 3, there is used such one as, for example, shown in FIG. 8.

In FIG. 8, reference numeral 9 designates an input terminal, and the audio signal from the amplifier 2 (refer to FIG. 7) is supplied through the input terminal 9 and a low-pass filter 10 to a sample and hold circuit 11 in which it is sampled and held and then supplied to an A/D (analog-to-digital) converter 12. The sample and hold circuit 11 and A/D converter 12 are controlled by a timing controller 14 to which the synchronizing signal is supplied from a terminal 13.

In the A/D converter 12, the audio signal is converted from the analog data to the digital data. This digital data therefrom is supplied through a signal processor 15 to a RAM (random access memory) 16 and written therein. At the same time, the data is read out from this RAM 16. To the signal processor 15 is supplied a pattern information regarding the arrangement order previously set in a pattern generator 18 in accordance with a key code supplied from a terminal 17 under the control of the timing controller 14.

Figure 9:
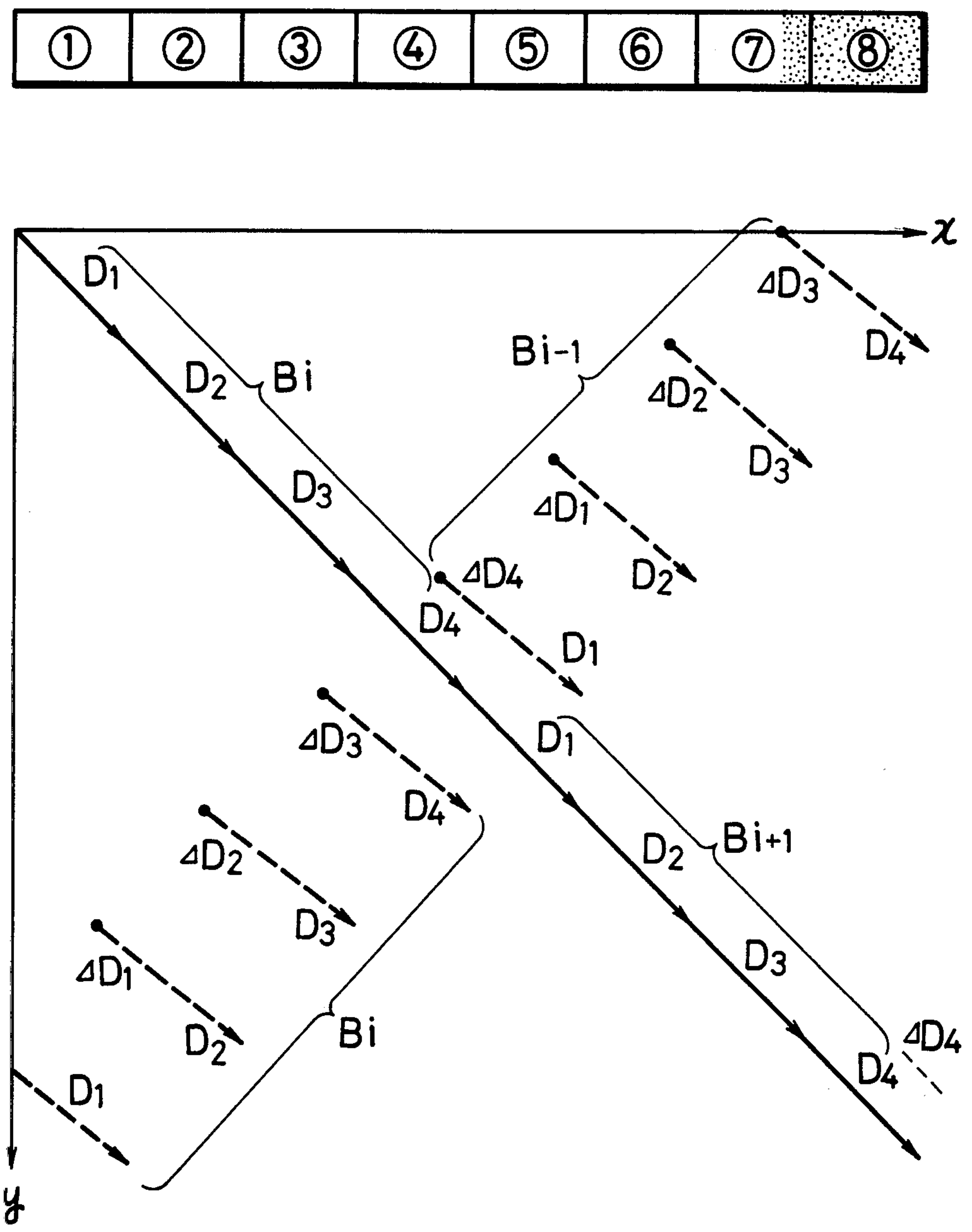
FIG. 9 is a diagram useful for explaining the operation of the encoder shown in FIG. 8.

As, for example, shown in FIG. 9, the memory areas of the RAM 16 are taken as ①, ②, ③, ④, ⑤, ⑥, ⑦ and ⑧ and the abscissa x is formed corresponding thereto, while the elapse of time is indicated on the ordinate y. Then, the writing of the RAM 16 is performed as shown by solid line arrows, while the reading of the RAM 16 is performed by broken line arrows.

To be more concrete, a data $D_1$ corresponding to the frame $f_1$ in the block Bi is first written in the memory area ① and then data $D_2$, $D_3$ and $D_4$ respectively corresponding to the frames $f_2$, $f_3$ and $f_4$ are written in the memory areas ②, ③ and ④ in turn. The data $D_1$, $D_2$, $D_3$ and $D_4$ respectively corresponding to the frames $f_1$, $f_2$, $f_3$ and $f_4$ in a block Bi+1 are made corresponding to the memory areas ⑤, ⑥, ⑦ and ⑧.

Upon reading, a data $\Delta D_3$ corresponding to the rear portion of the frame $f_3$ in a block Bi−1 and the data $D_4$ corresponding to the frame $f_4$ thereof are read out from the memory areas ⑦ and ⑧ as shown by the scattering points in FIG. 9. In this case, the data $\Delta D_3$ corresponds to the interpolation data portion $r_1$ shown in FIG. 4C. As to data $\Delta D_1$, $\Delta D_2$ and $\Delta D_4$, the same as above is carried out, respectively. After that, the data $\Delta D_2$ and the data $D_3$ are read out therefrom, the data $\Delta D_1$ and the data $D_2$ are read out therefrom and then the data $D_1$ and the data $\Delta D_4$ corresponding to the rear portion of the frame $f_4$ in the block Bi−1 are read out therefrom. As to the block Bi, the data are read similarly.

Thus, at the same time when the arrangement of the order is carried out, the interpolation data portions $r_1$, $r_2$, $r_3$ and $r_4$ formed from the unchanged audio signal as shown in FIGS. 3 and 4 can be inserted in the frames, respectively. Moreover, the timebase-compression can be carried out by changing the rate between the writing in and reading out from the RAM 16. Therefore, in response thereto, the sampling frequency $f_{AD}$ of the A/D converter 12 and a sampling frequency $f_{DA}$ of a D/A (digital-to-analog) converter 22 are made different from each other. Of course, the condition of $f_{AD} < f_{DA}$ is satisfied. The control of the D/A converter 22 is carried out by the timing controller 14.

The signal processed by the signal processor 15 is supplied through a digital volume unit 19 and a switching circuit 20 to the D/A converter 22. In this case, in response to the switching by the switching circuit 20 as will be described later, the control signal CL from a control signal generator 21 which employs, for example, a ROM (read only memory) is inserted into the front of each interpolation data portion as described above with reference to FIG. 6.

Figure 10:
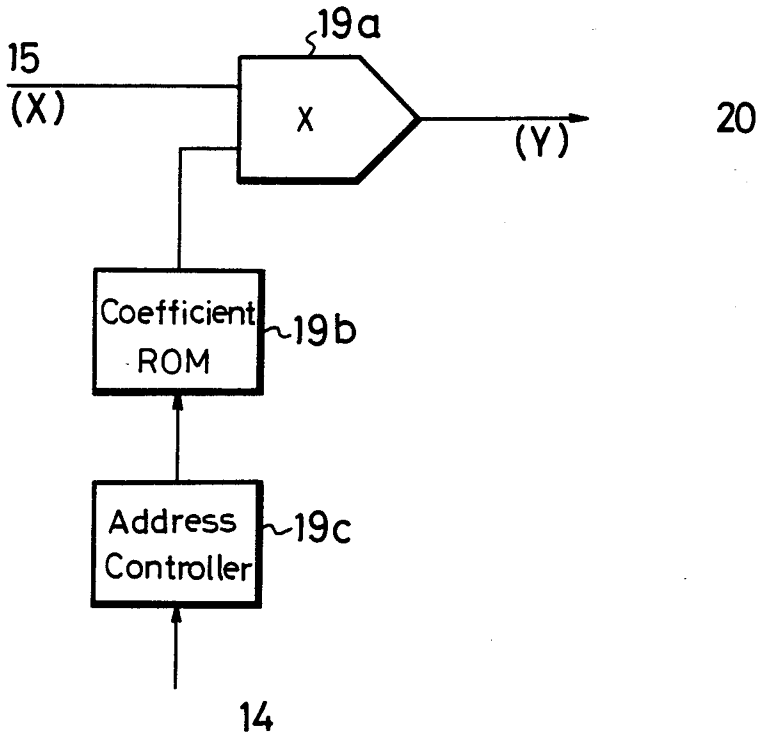
FIG. 10 is a block diagram showing an example of the digital volume shown in FIG. 8.
Figure 11:
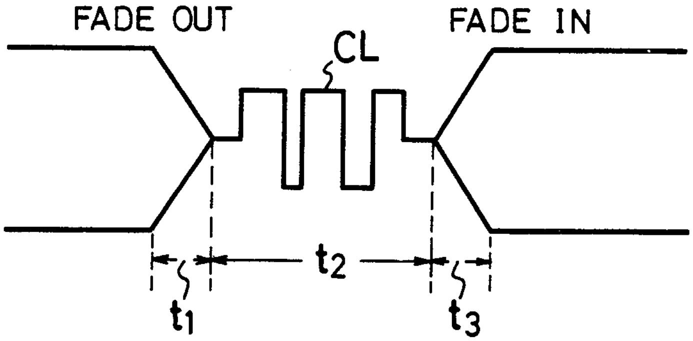
FIG. 11 is a diagram useful for explaining the operation of the digital volume shown in FIG. 10.

While various types are considered as the digital volume 19, such one having a construction as, for example, shown in FIG. 10 is used in this embodiment of the present invention. More particularly, in FIG. 10, reference numeral 19*a* designates a multiplier, 19*b* a coefficient ROM and 19*c* an address controller. The coefficient of the coefficient ROM 19*b* is 1 in the normal operation mode in which the control signal is not supplied. However, in a so-called fade-out mode in which the audio signals are removed from the program while the sound volume is lowered gradually in order to insert thereinto the control signal (which corresponds to time interval $t_1$ shown in FIG. 11), the coefficient thereof is changed as, for example, $\frac{7}{8}$, 6/8 . . . $\frac{1}{8}$ under the control of the address controller 19*c*. Meanwhile, in a so-called fade-in mode in which after the control signal is inserted to the program the audio signals are inserted into the program while the sound volume is gradually raised (which corresponds to time interval $t_3$ shown in FIG. 11), the coefficient thereof is changed as, for example, $\frac{1}{8}$, 2/8 . . . $\frac{7}{8}$ under the control of the address controller 19*c*.

Accordingly, if an input signal supplied to the multiplier 19*a* from the signal processor 15 (see FIG. 8) is taken as X and an output signal delivered from the multiplier 19*a* to the switching circuit 20 (see FIG. 8) is taken as Y, as the coefficient of the above coefficient ROM 19*b* is changed, the relation between the input signal X to the multiplier 19*a* and the output signal Y therefrom equals to Y=X in the normal operation mode, but in the fade-out mode, such relation is changed as $Y=\frac{7}{8}X$, Y=6/8X . . . $Y=\frac{1}{8}X$. On the contrary, in the fade-in mode, such relation is changed as $Y=\frac{1}{8}X$, Y=2/8X . . . $Y=\frac{7}{8}X$.

As described above, when in order that the change from the audio signal to the control signal is smoothly performed, the digital volume unit 19 decreases the sound volume with a predetermined duration of time, for example, approximately 1 ms in the digital fashion, while in order that the change from the control signal to the audio signal is performed smoothly, the digital volume 19 increases the sound volume unit with a predetermined duration of time, for example, approximately 1 ms in the digital fashion. Thus, it is possible to remove a bad influence of a transit phenomenon between the frames and between the frame and the control signal which will cause the discontinuous waveform. As such switching circuit, there can be used an interpolating circuit which does not decrease the sound volume to zero but can smoothly connect the portion between the waveforms as described above The insertion of the control signal is carried out by switching the switching circuit 20 and the switching timing thereof is performed as follows. Immediately before the switching of the frame, for example, about 1 ms before, the control signal is generated from the control signal generator 21. At that time, the movable contact of the switching circuit 20 is connected to its contact a. And, the encoded signal from the signal processor 15 is decreased by the digital volume unit 19 for about 1 ms, and at time point when the sound volume becomes substantially zero (the end point of time interval $t_1$ in FIG. 11), under the control of the timing controller 14, the switching circuit 20 is changed in position to its contact b. Accordingly, the control signal from the control signal generator 21 is supplied through the contact b of the switching circuit 20 to the D/A converter 22. At that time, the RAM 16 was already switched to the new frame. Then, at time point when the duration of time (corresponding to time interval $t_2$ in FIG. 11) of the control signal is ended, the switching circuit 20 is again changed in position to the contact a. Subsequently, the digital volume 19 raises the encoded signal derived from the signal processor 15 for about 1 ms such that its sound volume reaches the predetermined maximum value. As described above, the switching between the encoded signal and the control signal can be carried out smoothly.

The signal from the switching circuit 20 is supplied to the D/A converter 22 thereby converted from the digital data to the analog data. Until the signal processing is ended in this D/A converter 22, the muting for the D/A converter 22 is made effective by a muting signal from a terminal 23. When the signal processing is ended in the D/A converter 22, the muting therefor is released so that the analog data from the D/A converter 22 is transmitted through a low-pass filter 24 to an output terminal 25. This signal is transmitted through the transmitter 4 and the antenna 5 (both of which are shown in FIG. 7) to the receiving side as the audio signal encoded by the encoder 3.

Figure 12:
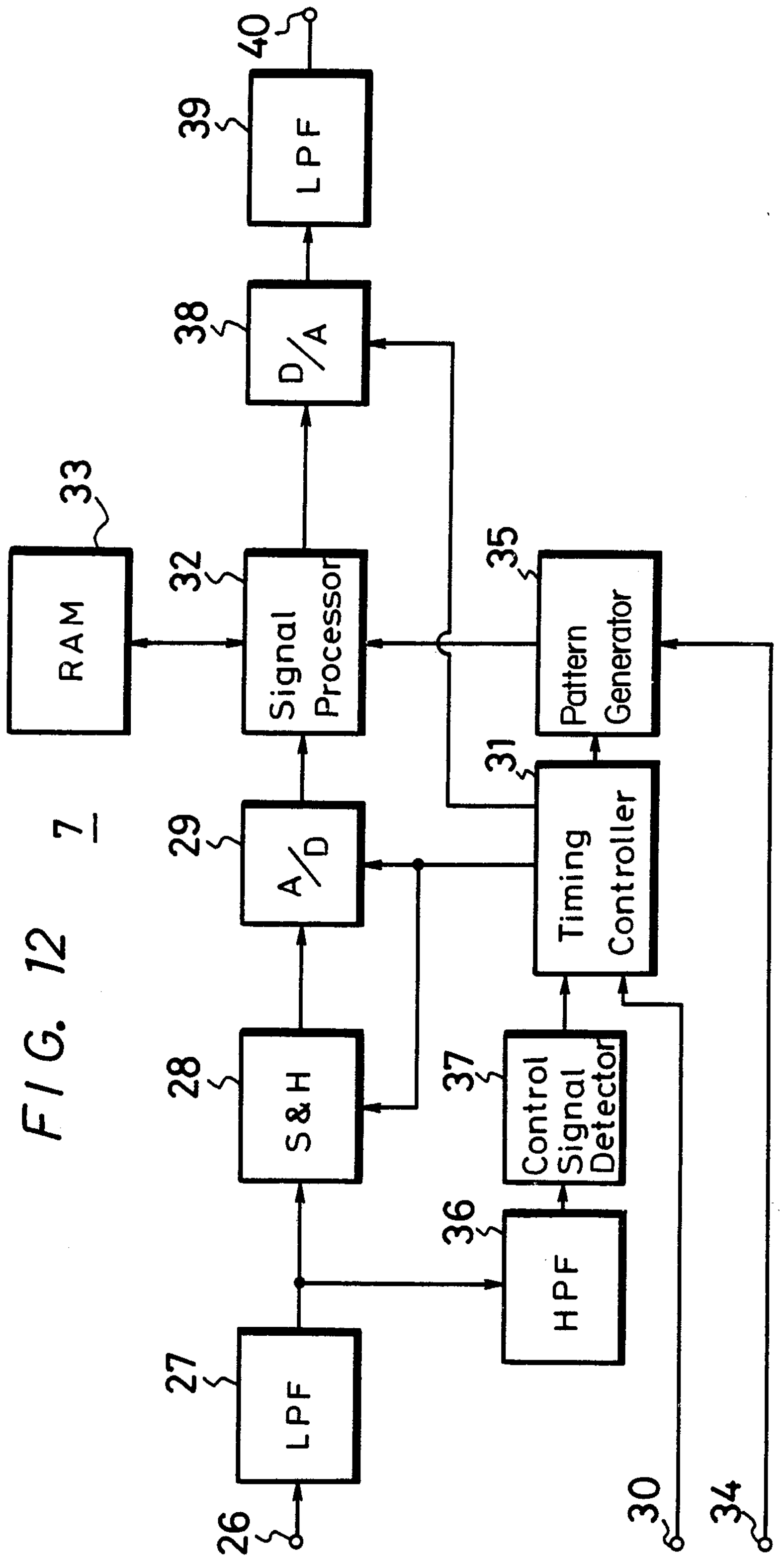
FIG. 12 is a block diagram showing a decoder used in the example of FIG. 7.

As the decoder 7 in the receiving side, there is employed such one as, for example, shown in FIG. 12.

In FIG. 12, reference numeral 12 designates an input terminal, and the audio signal from the transmitting side is supplied through the input terminal 26 and a lowpass filter 27 to a sample and hold circuit 28. In the sample and hold circuit 28, this audio signal is sampled and held and then supplied to an A/D converter 29 thereby converted from the analog data to digital data. The sample and hold circuit 28 and the A/D converter 29 are controlled by a timing controller 31 to which a synchronizing signal is supplied through a terminal 30.

The digital data from the A/D converter 29 is written through a signal processor 32 in a RAM 33 and then read out therefrom. To the signal processor 32 is supplied a pattern information signal regarding the arrangement order previously set in a pattern generator 35 in accordance with a key code from a terminal 34 under the control of the timing controller 31. Thus, on the basis of such pattern information, the data read out in the signal processor 32 is made corresponding to the normal audio signal which is re-arranged in exactly the original order.

A high-pass filter 36 is provided at the rear stage of the low-pass filter 27 to thereby prevent the flow of the control signal. The signal passed through this high-pass filter 36 is supplied to a control signal detector 37 which then detects the control signal. The control signal thus detected is supplied to the timing controller 31 in which the control signal is extracted by the window pulse shown in FIG. 6D. On the basis of the control signal extracted as above, the frame switching signal is formed and used for the switching of each frame upon writing and reading of the RAM 33.

Figure 13:
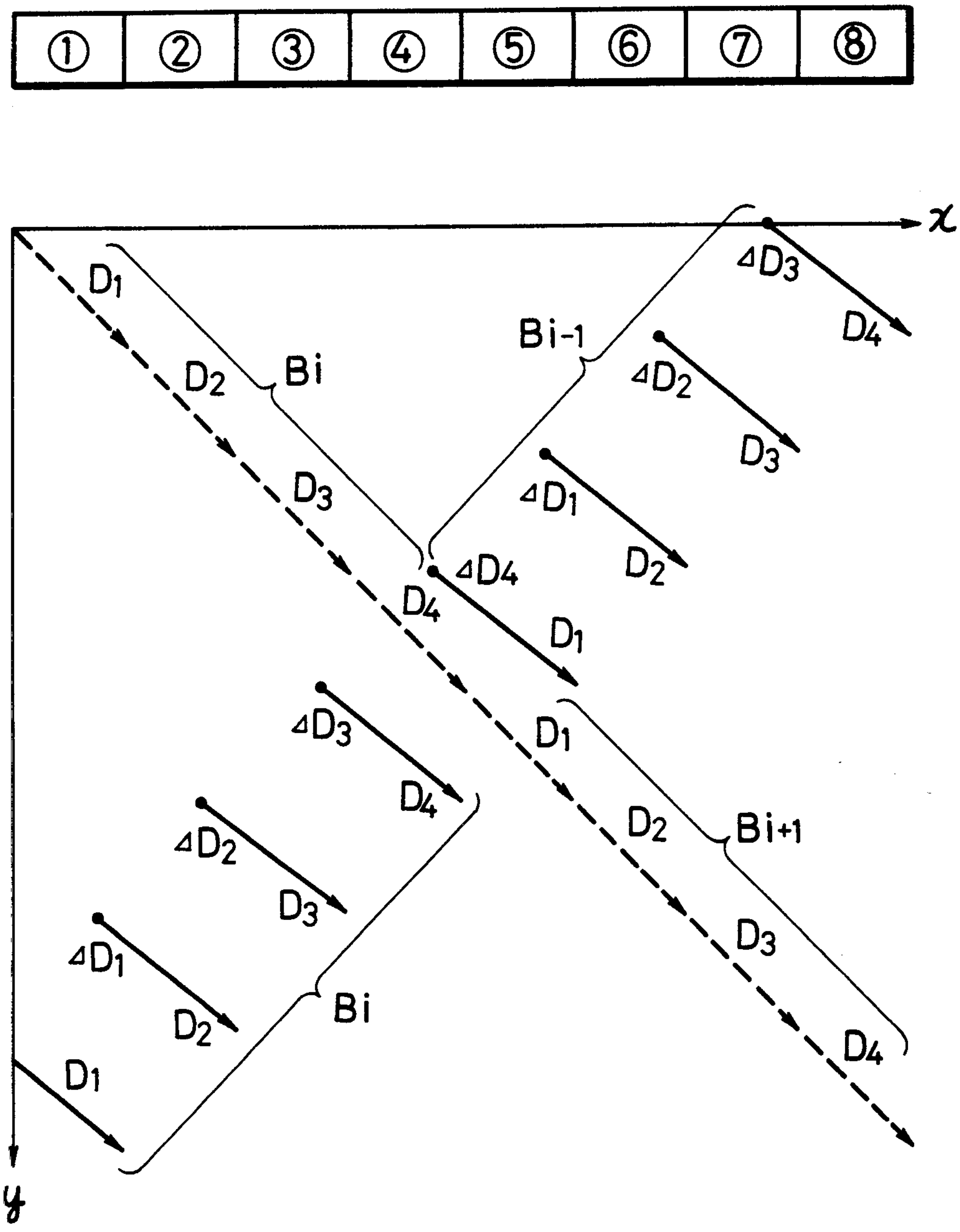
FIG. 13 is a diagram useful for explaining the operation of the decoder shown in FIG. 12.

More particularly, the writing and reading of the RAM 33 is carried out as shown in FIG. 13. In FIG. 13, the writing operation is made corresponding to solid line arrows and the reading operation is made corresponding to broken line arrows analogously to FIG. 9. The memory areas of the RAM 33 are represented as ①, ②, ③, ④, ⑤, ⑥, ⑦ and ⑧.

The fact that the re-arrangement of order can be carried out by the decoder 7 (see FIG. 7) can easily be understood by making FIG. 13 correspond to FIG. 9. Namely, in FIG. 9, the writing is carried out as shown by the solid line, while the reading is carried out as shown by the broken line. While, in FIG. 13, the writing is performed in the same way as that shown by the broken line in FIG. 9. This indicates the fact that the same data as in the memory areas ①, ②, ③, ④, ⑤, ⑥, ⑦ and ⑧ in FIG. 9 are written in the memory areas ①, ②, ③, ④, ⑤, ⑥, ⑦ and ⑧ in FIG. 13. The data thus written are read out in the same way as shown by the broken line in FIG. 13 which is the same as the solid line in FIG. 9. This means that the data before being re-arranged in order is delivered from the decoder 7 (see FIG. 7).

The digital data thus read out from the RAM 33 is converted to an analog data by a D/A converter 38 under the control of the timing controller 31 and delivered through a low-pass filter 39 to an output terminal 40. The sampling frequency $f_{AD}$ of the D/A converter 38 is made different from the sampling frequency $f_{DA}$ of the A/D converter 29 and they satisfy the condition of $f_{AD} > f_{DA}$. Accordingly, from the decoder 7 is generated the data before being re-arranged in order which is then supplied to the television receiver 8 (see FIG. 7).

While in the above embodiments the present invention is applied to the pay television broadcast system, it is needless to say that the invention is not limited to such pay television broadcast system but can similarly be applied to other broadcast system having the above function.

As set forth above, according to the present invention, the frames $f_1, f_2 \ldots f_n$ are re-arranged in order on the timebase and the redundant portions $R_1, R_2 \ldots R_n$ are inserted between the adjoining frames of the frames $f_1, f_2 \ldots f_n$. Therefore, it is possible that the interpolation data is inserted into the above redundant portions $R_1, R_2 \ldots R_n$, whereby the portions of the frames $f_1, f_2 \ldots f_n$ are prevented from being badly affected in the transmission path. Furthermore, since the control signal except the audio information is inserted into the redundant portions and each frame of the audio signal is switched on the basis of the control signal, the connection between the respective frames becomes smooth and it is removed that the connected portion is displaced and the tone quality is deteriorated. Thus, even when the audio signal is passed through the transmission path the band region of which is restricted as in the VTR having accompanied with the timebase fluctuation, the signal is not distorted and not mixed with a noise, thus the scrambling system having high quality and high reliability being made possible.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. In a scrambling system for an audio frequency signal in which an audio signal is divided into blocks, each block is formed of a plurality of frames, said frames are re-arranged on a timebase in a predetermined order for each block so as to provide an encoded signal, and said encoded signal is decoded by being re-arranged on the timebase in an original order, the improvement comprising:

first signal processing means for inserting a redundant portion between adjoining frames and timebase-compressing said frames in response to said redundant portions upon encoding;

control signal generating means for inserting a control signal other than an audio information signal into said redundant portions;

control signal detecting means for detecting said control signal upon decoding; and second signal processing means for removing said redundant portions in synchronism with said detected control signal and timebase-expanding said frames in response to said redundant portions.

2. A scrambling system for an audio frequency signal according to claim 1; further comprising means for inserting said control signal into said redundant portion by fade-in processing upon encoding, and connecting said redundant portion to a succeeding frame by fade-out processing.

3. A system for scrambling and descrambling an audio signal comprising:

means for dividing said audio signal into a plurality of block signals, and for dividing each of said block signals into a plurality of frame signals;

means for rearranging said frame signals on a time-base from an original order to a predetermined, scrambled order to produce a rearranged signal, and for inserting a redundant portion of said rearranged signal between adjacent frame signals in said rearranged signal to produce an expanded signal;

means for timebase compressing said expanded signal to produce a compressed signal;

detecting means for detecting said redundant portions in said compressed signal and producing a detected signal in response thereto;

means responsive to said detected signal for extracting said redundant portions of said rearranged signal from said compressed signal and for rearranging said frame signals to said orignal order to produce an original order signal;

means responsive to said redundant portions of said rearranged signal for timebase expanding said original order signal to produce said audio signal;

means for generating a control signal; and means for inserting said control signal in said redundant portion of said rearranged signal.

4. A system for scrambling an audio signal comprising:

means for dividing said audio signal into a plurality of block signals, and for dividing each of said block signals into a plurality of frame signals;

means for rearranging said frame signals on a time-base from an original order to a predetermined, scrambled order to produce a rearranged signal, and for inserting a redundant portion of said rearranged signal between adjacent frame signals to produce an expanded signal;

means for timebase compressing said expanded signal to produce a scrambled audio signal;

pattern generator means for generating a scramble pattern signal corresponding to said predetermined scrambled order of said frame signals as rearranged to produce said rearranged signal;

means for supplying said scramble pattern signal to said means for rearranging;

means for generating a control signal; and means for inserting said control signal in said redundant portion of said rearranged signal.

5. The system of claim 4, wherein said means for inserting includes switch means for alternately supplying said expanded signal and said control signal to said means for timebase compressing.

6. The system of claim 5, and further comprising volume control means for fading out said expanded signal before said means for inserting inserts said control signal, and for fading in said expanded signal after said means for inserting inserts said control signal.

7. A system for descrambling a scrambled audio signal having a plurality of time-base compressed block signals, each of said block signals including a plurality of frame signals rearranged from an original order to a predetermined scrambled order, with a redundant portion inserted between adjacent frame signals and including a control signal inserted in said redundant portion, said system comprising:

detecting means for detecting said control signal in said redundant portions in said scrambled audio signal and producing a detected signal in response thereto;

means responsive to said detected signal for extracting said redundant portions from said scrambled audio signal and rearranging said frame signals to said original order to produce an original order signal; and means responsive to said redundant portions for time-base expanding said original order signal to produce the original audio signal.

* * * * *